United States Patent
Wada et al.

(10) Patent No.: US 7,726,014 B2
(45) Date of Patent: Jun. 1, 2010

(54) MANUFACTURING UNIT OF POSITION CONTROLLER

(75) Inventors: Shigeru Wada, Kishiwada (JP); Junichi Tanii, Izumi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 866 days.

(21) Appl. No.: 11/287,935

(22) Filed: Nov. 28, 2005

(65) Prior Publication Data
US 2006/0143902 A1 Jul. 6, 2006

(30) Foreign Application Priority Data
Nov. 29, 2004 (JP) ............................. 2004-344007

(51) Int. Cl.
*H01R 9/00* (2006.01)
*H05K 3/00* (2006.01)
(52) U.S. Cl. ............................. 29/842; 29/729; 29/739; 359/407; 359/408; 359/554
(58) Field of Classification Search ............... 29/842, 29/729, 739, 844, 850, 857, 868; 60/527; 359/407, 408, 554–557
See application file for complete search history.

(56) References Cited

U.S. PATENT DOCUMENTS

| 5,419,788 | A | * | 5/1995 | Thoma et al. ............... 148/402 |
| 6,072,639 | A | | 6/2000 | Onda |
| 6,466,370 | B2 | * | 10/2002 | Wada et al. ................. 359/554 |
| 6,543,224 | B1 | | 4/2003 | Barooah |
| 2001/0025477 | A1 | | 10/2001 | Hara et al. |

FOREIGN PATENT DOCUMENTS

| JP | 06-060577 A | 3/1994 |
| JP | 07-072927 A | 3/1995 |
| JP | 2002-098911 A | 4/2002 |
| JP | 2004-076882 A | 3/2004 |

* cited by examiner

*Primary Examiner*—Thiem Phan
(74) *Attorney, Agent, or Firm*—Sidley Austin LLP

(57) ABSTRACT

First, a position control mechanism having a fixed part and a movable part, and a driver that changes position of the movable part relative to the fixed part is prepared. Next, a manufacturing unit having first and second holders and a coupler that couples the first and second holders is prepared. A conductive actuator is held in tension between the first and second holders. Further, the first holder is attached to the movable part and the second holder is attached to the fixed part. After that, the coupler is cut from the manufacturing unit, the first and second holders are separated from each other.

8 Claims, 10 Drawing Sheets

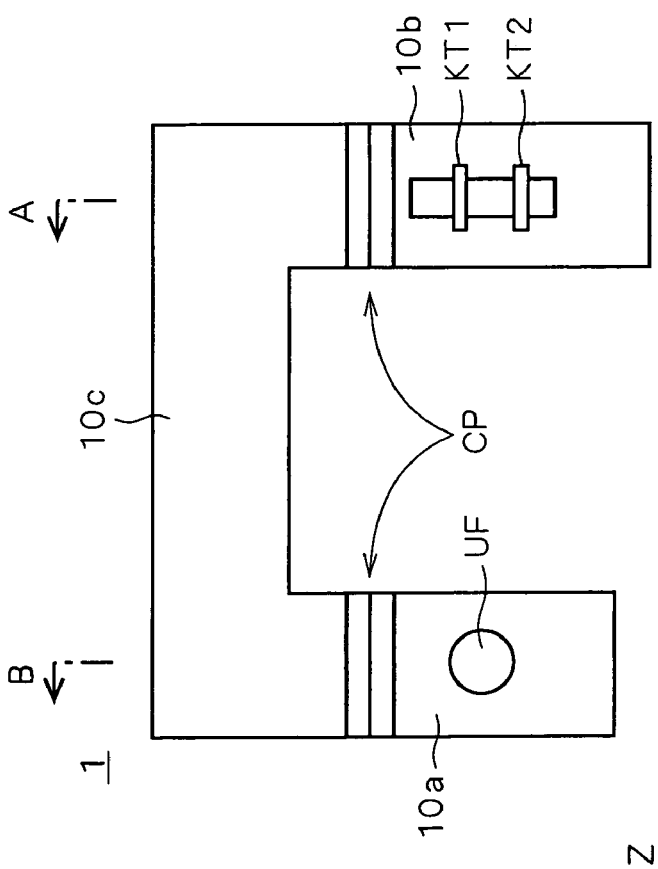
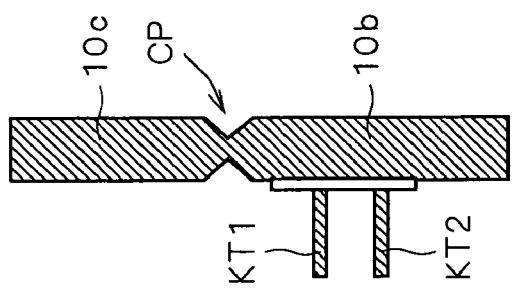
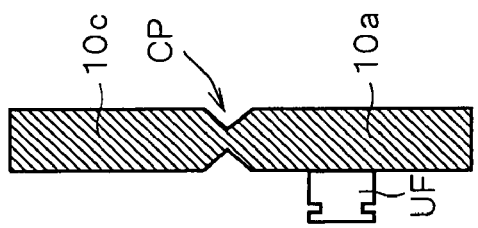

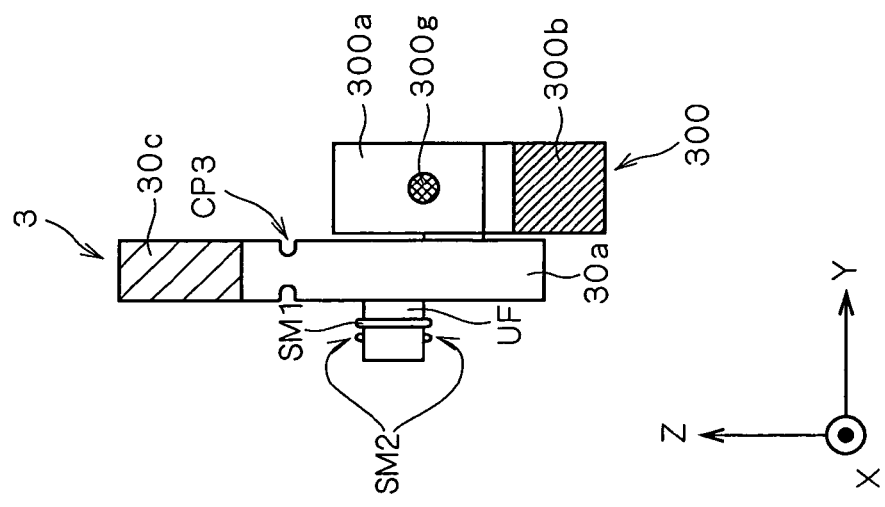
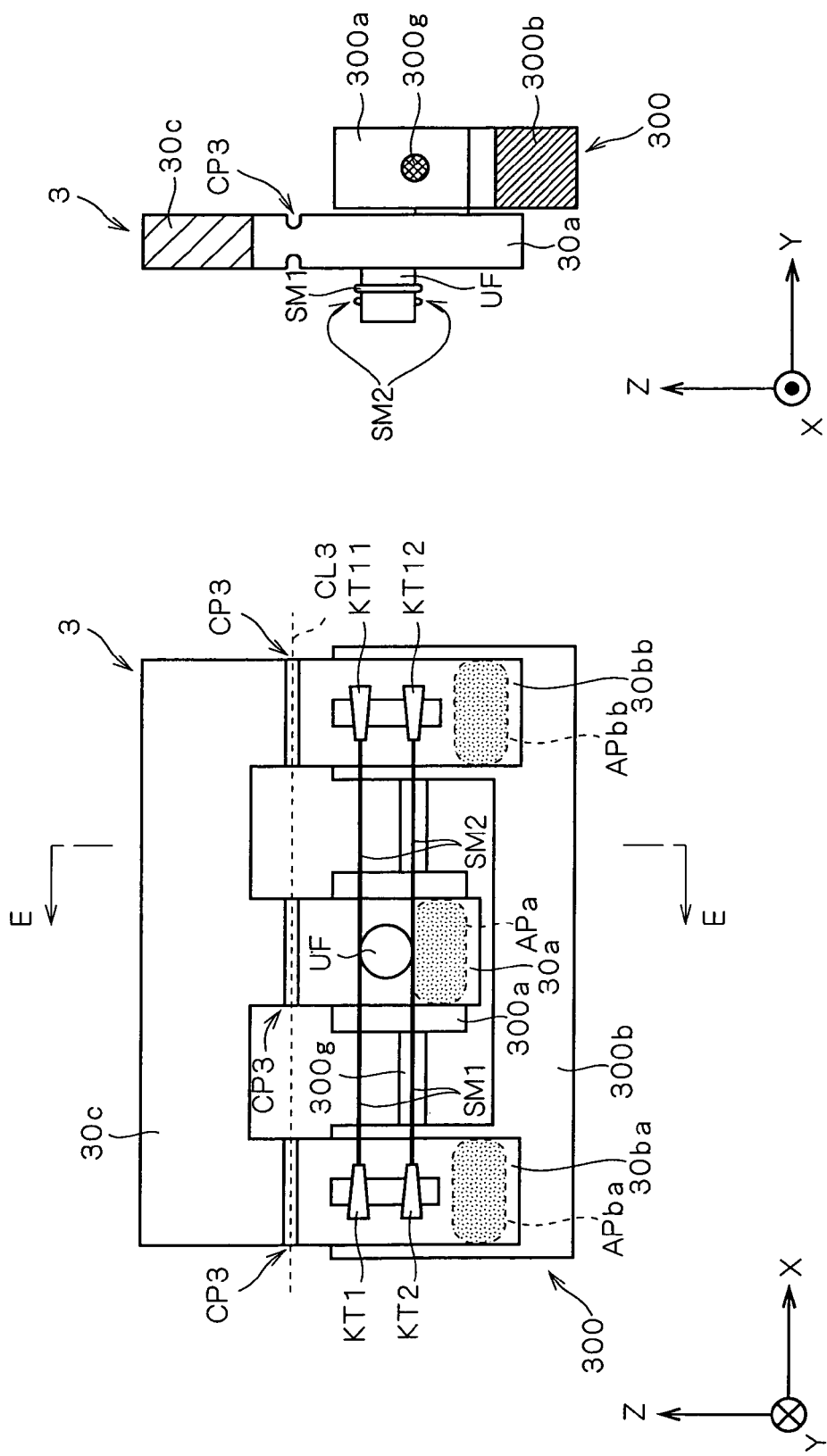

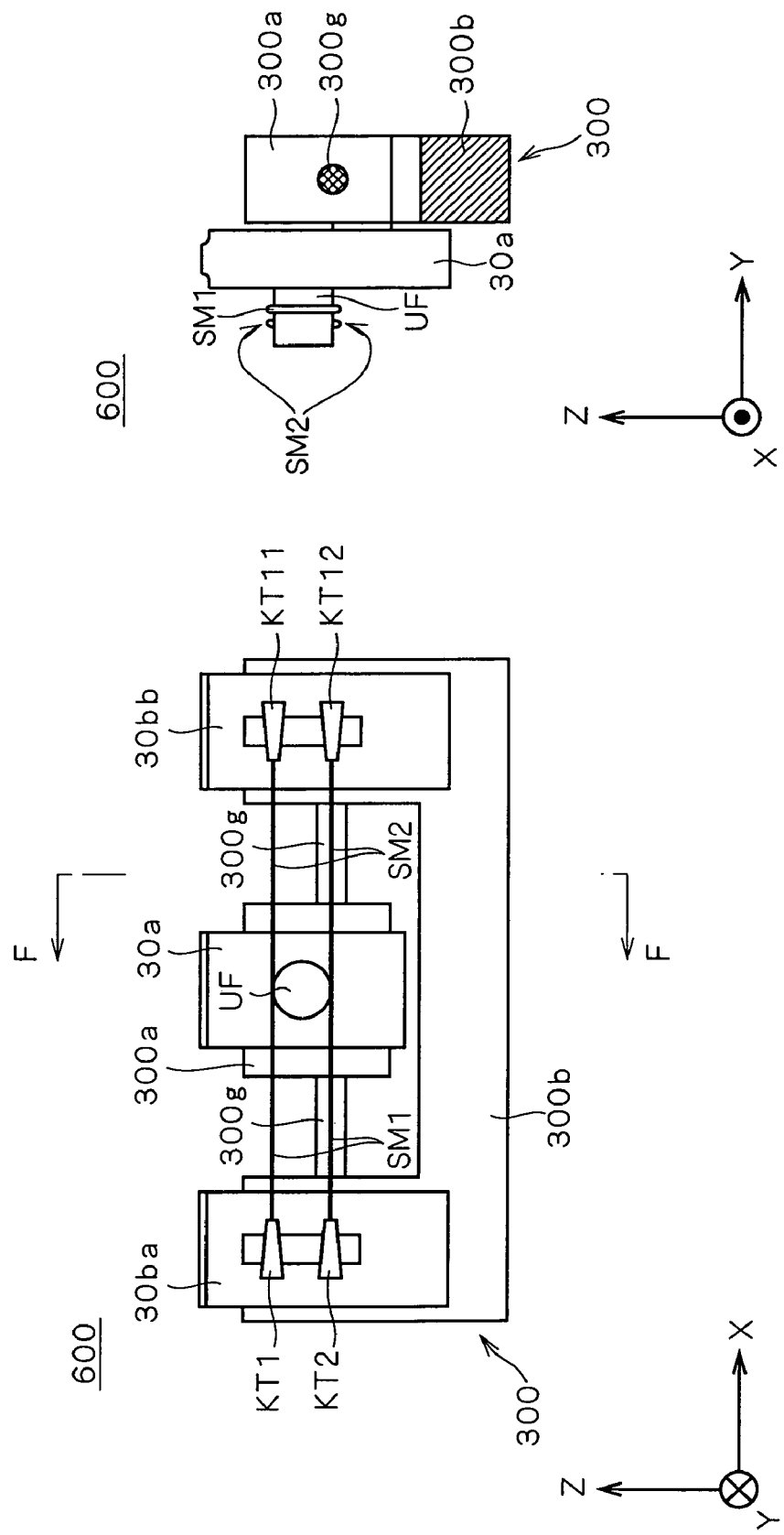

MANUFACTURING UNIT OF POSITION CONTROLLER

This application is based on application No. 2004-344007 filed in Japan, the contents of which are hereby incorporated by reference.

BACKGROUND OF THE INVENTION

1. Field of the Invention

The present invention relates to a conductive actuator.

2. Description of the Background Art

An actuator realizing a small displacement by a string-shaped shape memory alloy is promising as an actuator of a small apparatus. However, since the displaceable amount of the SMA is very small, high mounting precision is demanded.

For example, in the case of applying an actuator using an SMA (SMA actuator) to a camera unit to be assembled in a portable phone having a thickness of about 10 mm, the size of the SMA actuator has to be also set to about 10 mm. Since a displaceable amount of a general SMA is about 4%, the displaceable range of the SMA is ±0.2 mm. Therefore, in the case of effectively utilizing 90% or more of the displaceable range, the mounting precision of the SMA actuator has to be set to ±0.02 mm.

Since a string-shaped SMA has flexibility, it is difficult to mount the SMA actuator with high precision. Moreover, a general Ti shape memory alloy is heat-sensitive, so that solder cannot be used for fixation. It makes more difficult to perform high-precision fixation.

To fix an SMA, conventionally, methods such as caulking, press fitting, sandwiching of the SMA between metal plates, and the like are used (for example, Japanese Patent Application Laid-Open Nos. 06-60577 (1994), 2002-98911, and 2004-76882).

However, each of the caulking, press fitting, and sandwiching of the SMA between metal plates requires a considerable force for fixation. The possibility that each of the methods exerts an adverse influence on the precision in mounting of an SMA actuator to a small apparatus is high.

For example, Japanese Patent Application Laid-Open No. 06-60577 (1994) discloses a technique using an SMA actuator as an actuator for moving a head of a magnetic recording apparatus. In the technique, a head holding plate with a spring is pulled by the SMA actuator at an acute angle, a movable amount of the head is increased by the mechanism, and both ends of the SMA actuator are attached to terminals by caulking. Such a configuration has a problem such that, when the length of the SMA actuator varies, the stress on the head holding plate fluctuates and the distance between the head and the disk surface becomes unstable. When the head is floated by air resistance as a precondition, the head holding plate has to be soft, so that the problem cannot be solved unless the length of the SMA actuator and the stress should be managed. In the technique, however, the solving method is not considered.

Japanese Patent Application Laid-Open No. 2002-98911 discloses a driving unit in which the length of the SMA actuator and the stress are adjusted. In the technique, however, an SMA actuator is formed by assembling a driving part so as to be sandwiched by the SMA actuator in a state where the SMA actuator is temporarily held. Consequently, it is feared that the SMA actuator may be deviated or deformed due to stress applied when the driving part is assembled and stress of temporary holding, and the adjusted length of the SMA actuator shifts by 0.02 mm or more. The larger the number of components is, the more an error occurs in a part size (parts tolerance), so that it is extremely difficult to realize adjustment of the length of the SMA actuator with high precision of hundreds µm or less. The state where the SMA actuator is temporarily held denotes that the SMA actuator is in an unstable state. There is, consequently, a problem such that it is difficult to assemble the driving parts.

Further, the shape of the terminal is an essential factor to fix the SMA actuator with high precision. Japanese Patent Application Laid-Open No. 2004-76882 discloses a small terminal capable of retaining an SMA actuator with high precision in a state where the length is adjusted. Japanese Patent Application Laid-Open No. 2004-76882 pays attention only to the terminal but does not suggest adjustment of the distance between a movable member and a fixed member in the SMA actuator.

That is, conventionally, it is difficult to improve the precision of attaching an SMA actuator to a small device due to various errors such as an error in the size of a part and an installation error.

SUMMARY OF THE INVENTION

The present invention is directed to a manufacturing unit used as a manufacture body of a driver at the time of manufacturing the driver that is attached to a position control mechanism having a fixed part and a movable part and changes position of the movable part relative to the fixed part.

According to the present invention, the manufacturing unit includes: a first holder for being attached to the movable part in a state where a predetermined position in a conductive actuator is held by the first holder; a second holder for being attached to the fixed part in a state where another predetermined position which is different from the predetermined position in the conductive actuator is held by the second holder; and a coupler that couples the first and second holders.

The length of the conductive actuator is adjusted with high precision in a state of the manufacturing unit in which the first and second holders are coupled and fixed, and the manufacturing unit is attached to the position control mechanism. After that, the first and second holders can be separated from each other. Thus, the conductive actuator using the shape memory alloy or the like can be attached to the position control mechanism with high precision without being influenced by various errors.

The present invention is also directed to a manufacturing method of a position controller including a position control mechanism having a fixed part and a movable part, and a driver that changes position of the movable part relative to the fixed part.

According to the present invention, the manufacturing method of a position control mechanism includes the steps of: (a) obtaining a manufacturing unit having first and second holders and a coupler that couples the first and second holders; (b) holding a conductive actuator in tension between the first and second holders; (c) attaching the first holder to the movable part and attaching the second holder to the fixed part; and (d) cutting the coupler from the manufacturing unit, thereby separating the first and second holders from each other.

The conductive actuator using the shape memory alloy or the like can be attached to the position control mechanism with high precision without being influenced by various errors.

Therefore, an object of the present invention is to provide a technique capable of attaching a conductive actuator using a shape memory alloy or the like to a position control mechanism with high precision without being influenced by various errors.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3C are diagrams illustrating a manufacturing unit;

FIGS. 9A and 9B are diagrams showing manufacture of a position controller according to a modification;

FIGS. 10A and 10B are diagrams showing manufacture of a position controller according to a modification.

DESCRIPTION OF THE PREFERRED EMBODIMENTS

Preferred embodiments of the present invention will be described below with reference to the drawings.

Outline of Position Controller

Figure 1A:
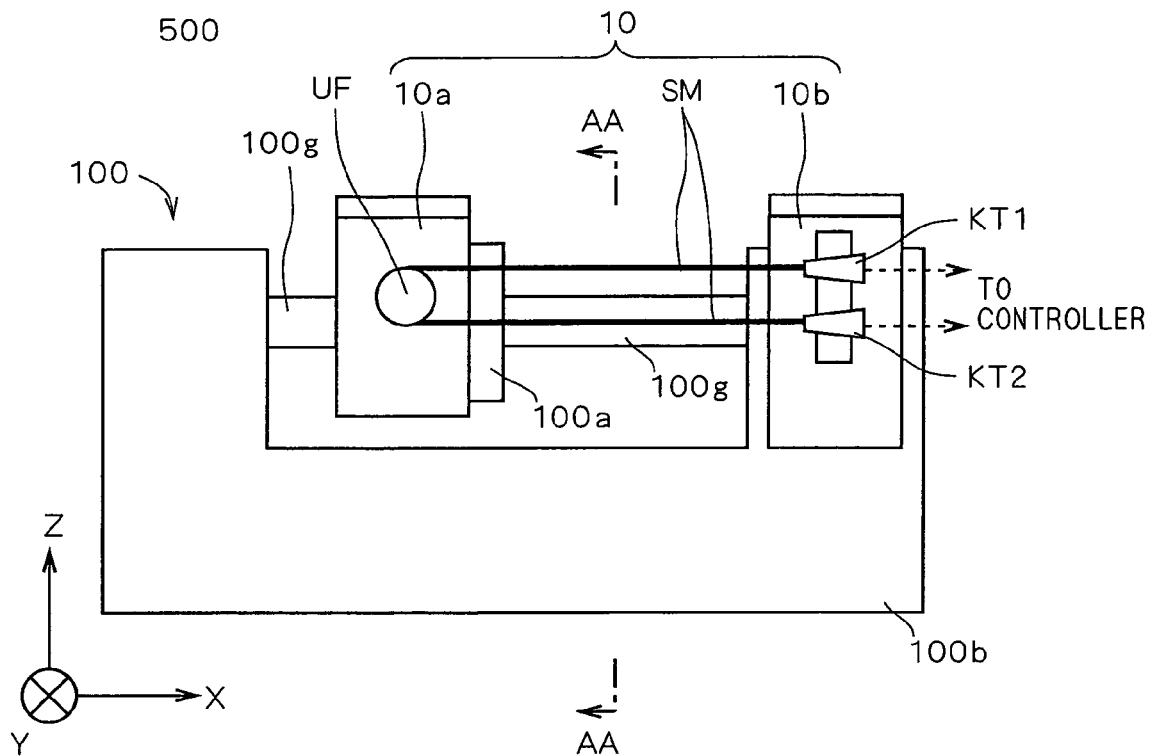
FIGS. 1A and 1B are diagrams illustrating a position controller according to a preferred embodiment of the present invention.
Figure 1B:
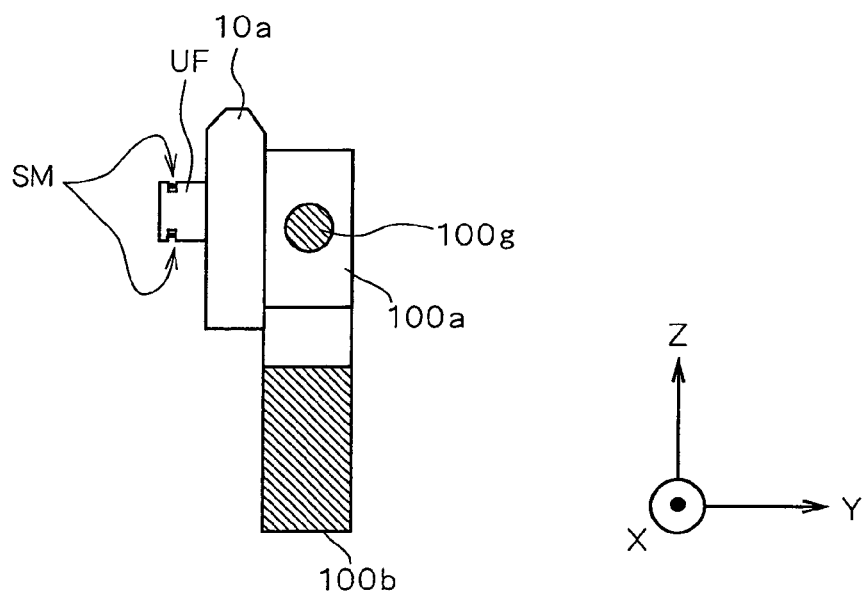

FIGS. 1A and 1B are diagrams illustrating a position controller 500 manufactured by a manufacturing method according to a preferred embodiment of the present invention. In FIGS. 1A and 1B and subsequent diagrams, three axes of an XYZ three-dimensional orthogonal coordinate system are shown for clarifying the azimuth. FIG. 1A is a front view showing the appearance of the position controller 500, and FIG. 1B is a cross section taken along line AA-AA of FIG. 1A.

As shown in FIGS. 1A and 1B, the position controller 500 is provided to drive a predetermined object to be driven (not shown, such as a taking lens in a portable phone) and includes a position control mechanism 100 and a driver 10 attached to the position control mechanism 100.

The position control mechanism 100 is constructed as a so-called linear guide and includes a movable part 100a, a fixed part 100b, and a movement guide 100g.

The fixed part 100b is a part fixed to a housing or the like of an apparatus having an object to be driven by the position controller 500.

The movable part 100a is a part for holding an object to be driven (not shown) and is slidably held by the movement guide 100g. By changing the position relative to the fixed part 100b in the ±X directions, driving of the object to be driven is realized.

The movement guide 100g is a part having a rod shape and guiding movement in the X directions of the movable part 100a.

In the position control mechanism 100, the surface in the −Y direction of the movable part 100a and that of the fixed part 100b are constructed as surfaces to which the driver 10 is attached.

The driver 10 mainly has a movable holder 10a fixed to the surface in the −Y direction of the movable part 100a, and a fixing holder 10b fixed to the surface in the −Y direction of the fixed part 10b.

A so-called U-turn hook UF is provided for the surface in the −Y direction of the movable holder 10a, and two metal terminals KT1 and KT2 are provided for the surface in the −Y direction of the fixing holder 10b.

The metal terminals KT1 and KT2 hold and fix one end and the other end of a string-like shape memory alloy SM by, for example, so-called caulking. The string-shaped shape memory alloy SM is hooked by the U-turn hook UF, and the one end and the other end of the shape memory alloy SM are held and fixed by the metal terminals KT1 and KT2 in a state where the shape memory alloy SM is pulled under predetermined tension. At this time, by adjusting tensile stress on the shape memory alloy SM, the length of the shape memory alloy SM is properly adjusted.

Although not shown here, a wiring attachment part for attaching a wire for passing current is provided on the side opposite to the side to which the shape memory alloy SM is attached (that is, the U-turn hook UF side) of the metal terminals KT1 and KT2. By controlling passage of current to the shape memory alloy SM by an external controller in a state where the shape memory alloy SM and the wire are attached to the metal terminals KT1 and KT2, the temperature and the length of the shape memory alloy SM are changed and the relative position in one direction (X direction) of the movable part 100a with respect to the fixed part 100b is changed.

In the case where the movable holder 10a and the fixing holder 10b are made of plastic, the metal terminals KT1 and KT2 can be provided for the fixing holder 10b by insert molding as a molding method of burying a metal part or the like in a plastic molded component.

Although the U-turn hook UF is provided for the movable holder 10a and the two metal terminals KT1 and KT2 are provided for the fixing holder 10b, the present invention is not limited to the configuration. For example, the metal terminals KT1 and KT2 may be provided for the movable holder 10a and the fixing holder 10b, respectively.

The method of holding/fixing the shape memory alloy SM by the metal terminals KT1 and KT2 is not limited to caulking. Another method such as press fitting may be also employed. In the case of using press fitting, however, a stress for pushing a part in the longitudinal direction of the shape memory alloy SM is necessary and the possibility that precision in adjustment of the length of the shape memory alloy SM deteriorates is high. Consequently, to increase the precision in adjustment of the length of the shape memory alloy SM, caulking is more preferable.

Although it is very difficult to adjust the length of the shape memory alloy SM attached to the driver 10 with high precision, by employing a manufacturing method of a position controller which will be described in detail below, the length of the shape memory alloy SM can be adjusted with high precision.

Method of Manufacturing Position Controller

In a manufacturing method of a position controller according to a preferred embodiment of the present invention, a manufacturing unit 1 (refer to FIGS. 3A to 3C) in which the movable holder 10a and the fixing holder 10b are coupled via a predetermined coupler, and the relative positions of the movable holder 10a and the fixing holder 10b are fixed is prepared. In a state where the shape memory alloy SM is attached to the movable holder 10a and the fixing holder 10b while adjusting the length of the shape memory alloy SM, the manufacturing unit 1 is attached to the position control mechanism 100. After that, the coupler is cut so that the movable holder 10a and the fixing holder 10b are separated. By the operation, the length of the shape memory alloy SM attached to the driver 10 is adjusted with high precision.

The position controller manufacturing method according to the preferred embodiment of the present invention will be concretely described with reference to the manufacturing flow of the position controller 500 according to the preferred embodiment of the present invention shown in FIG. 2 and FIGS. 3A to 3C to FIGS. 7A and 7B.

Figure 2:
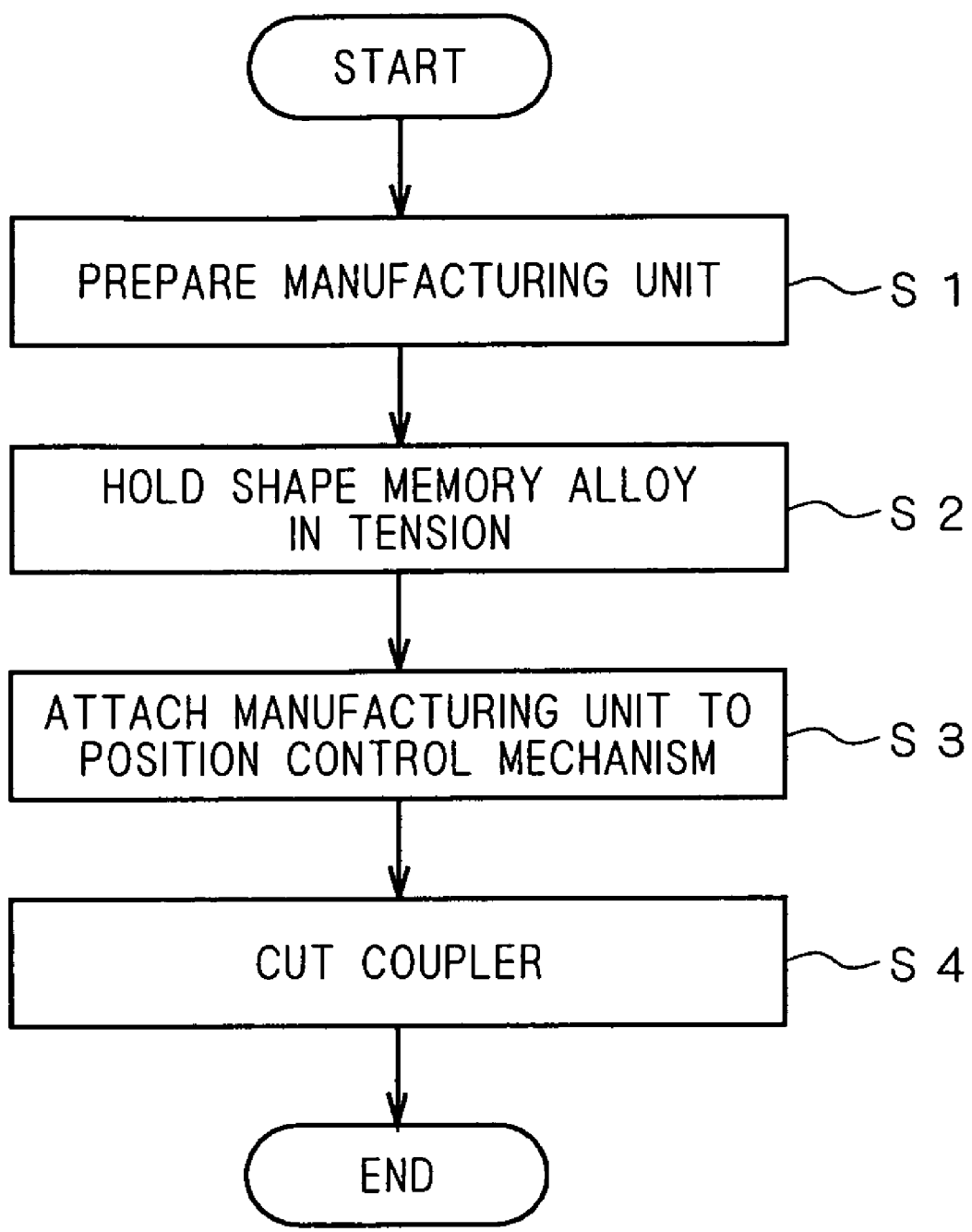
FIG. 2 is a flowchart showing a flow of manufacturing the position controller according to the preferred embodiment of the present invention.

First, the manufacturing unit 1 used for manufacturing the position controller 500 used as a body of the driver 10 is prepared (step S1 in FIG. 2).

The manufacturing unit 1 will be described here. FIGS. 3A to 3C are diagrams illustrating the manufacturing unit 1 and are a front appearance view of the manufacturing unit 1, a cross section taken along line A-A of FIG. 3A, and a cross section taken along line B-B of FIG. 3A, respectively.

As shown in FIGS. 3A to 3C, the manufacturing unit 1 is a plate-shaped plastic part having a small length in the Y directions, spread in an XZ plane, and having an inverted U-shape in FIG. 3A. One end side of the manufacturing unit 1 is constructed as the movable holder 10a, and the other end side is constructed as the fixing holder 10b. Further, the manufacturing unit 1 has a coupler (bridge part) 10c that couples the movable holder 10a and the fixing holder 10b. Each of the movable holder 10a, the fixing holder 10b, and the coupler 10c is a plate-shaped member having high rigidity.

As described above, the U-turn hook UF by which the shape memory alloy SM is hooked to be held is provided for the surface in the −Y direction of the movable holder 10a, and the metal terminals KT1 and KT2 for holding and fixing both ends of the shape memory alloy SM by caulking are provided for the surface in the −Y direction of the fixing holder 10b. That is, the metal terminals KT1 and KT2 are provided for one of almost parallel two sides of the U letter of the manufacturing unit 1, and the U-turn hook UF is provided for the other side.

The thickness in the Y directions of each of a boundary portion CP between the movable holder 10a and the coupler 10c and a boundary portion CP between the fixing holder 10b and the coupler 10c is much smaller than that of the other part of the manufacturing unit 1. The boundary portion CP is a part to be cut at the time of separating the coupler 10c from the manufacturing unit 1.

After preparing (or obtaining) the manufacturing unit 1 in step S1 as described above, the shape memory alloy SM is held under tension between the movable holder 10a and the fixing holder 10b in the manufacturing unit 1 (step S2 in FIG. 2).

The details of step S2 will now be described.

Figure 4:
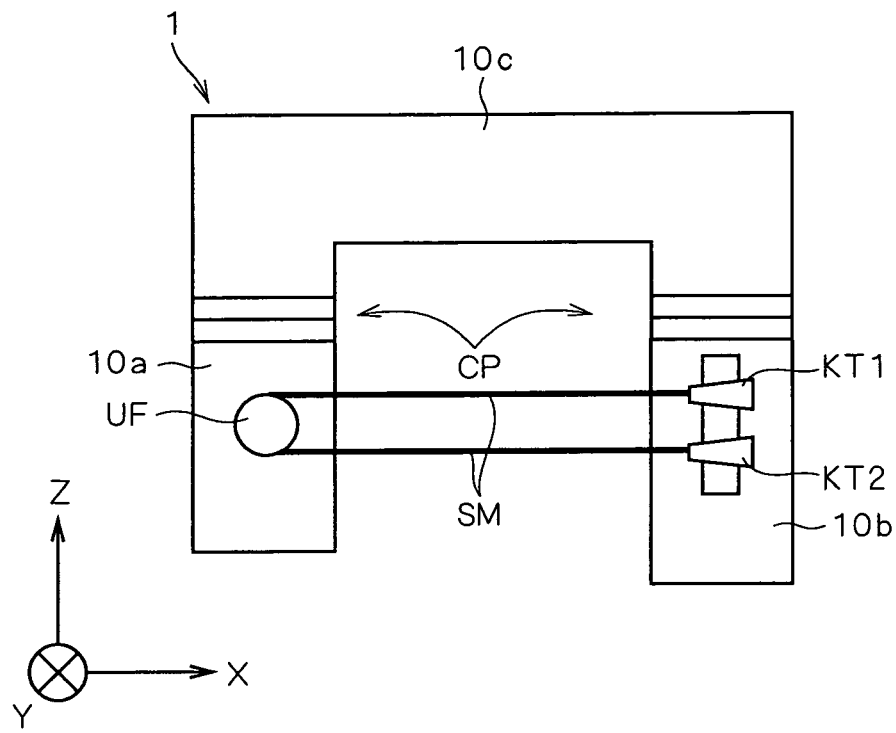
FIG. 4 is a diagram illustrating a shape memory alloy holding state.

FIG. 4 is a diagram illustrating a state where the shape memory alloy SM is held.

In step S2, for example, first, one end of the string-like shape memory alloy SM is held and fixed to the metal terminal KT1 by caulking. The shape memory alloy SM is hooked in a groove in the U-turn hook UF and the other end of the shape memory alloy SM can be held and fixed to the metal terminal KT2 by caulking.

Figure 5A:
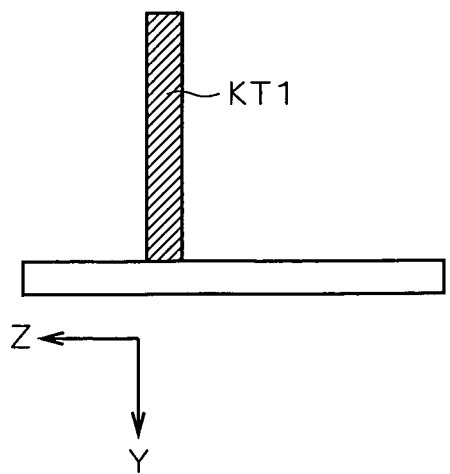
FIGS. 5A and 5B are diagrams illustrating holding and fixing of a shape memory alloy by caulking.
Figure 5B:
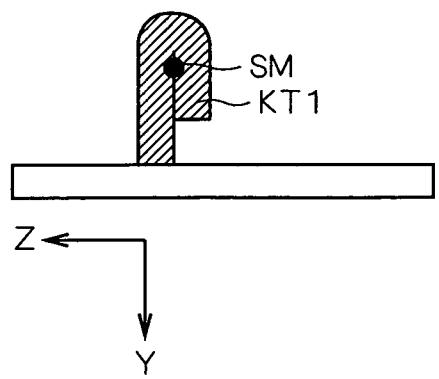

FIGS. 5A and 5B are diagrams illustrating holding and fixing of the shape memory alloy SM by caulking. FIGS. 5A and 5B are schematic cross sections of a portion around the metal terminal KT1 as an example. As shown in FIG. 5A, in the manufacturing unit 1, the metal terminal KT1 is an upright plate-shaped member. After the string-like shape memory alloy SM is made come into contact with the plate face of the metal terminal KT1, as shown in FIG. 5B, the metal terminal KT1 is bent to sandwich the shape memory alloy SM, thereby realizing fixing of the shape memory alloy SM by caulking.

In the preferred embodiment, by adjusting stress applied to the shape memory alloy SM at a predetermined temperature, the length of the shape memory alloy SM attached to the manufacturing unit 1 is unconditionally determined in accordance with the distance between the U-turn hook UF and the metal terminals KT1 and KT2.

The shape memory alloy SM is attached so as to stretch between the two parallel sides of the U shape of the manufacturing unit 1. The bent portion ("bent portion") of the U shape of the manufacturing unit 1 and the shape memory alloy SM are sufficiently apart from each other.

After the shape memory alloy SM is held in a state where tension is applied between the movable holder 10a and the fixing holder 10b of the manufacturing unit 1 in step S2 as described above, the manufacturing unit 1 is attached to the position control mechanism 100 (step S3 in FIG. 2).

The details of step S3 will now be described.

Figure 6:
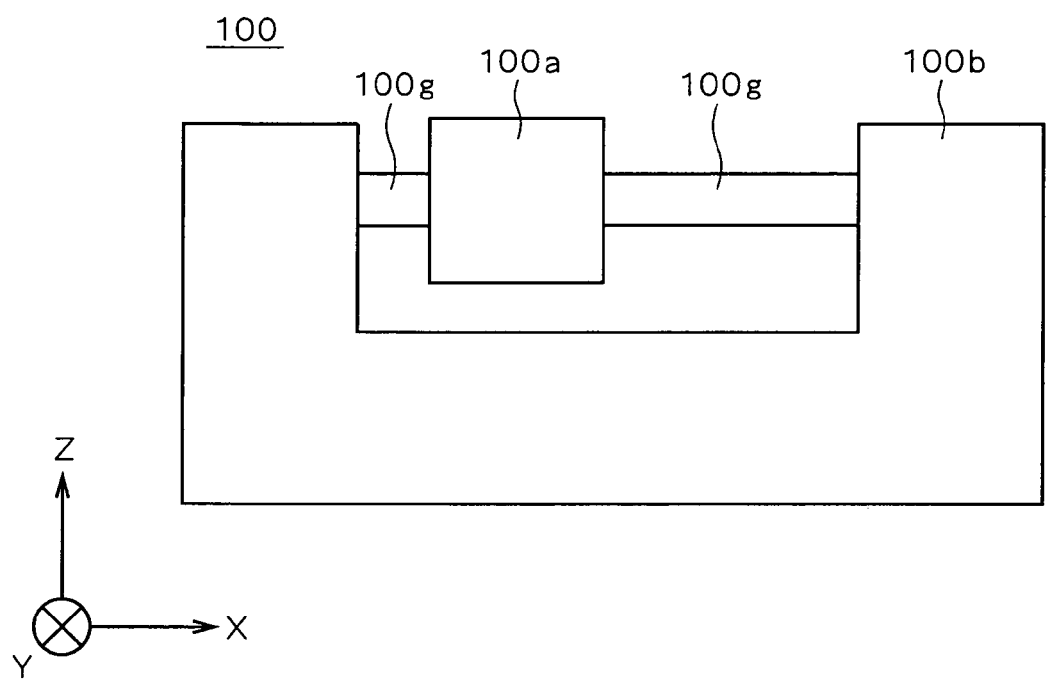
FIG. 6 is a diagram illustrating the appearance of a position control mechanism.

FIG. 6 is a diagram showing the appearance of the position control mechanism 100. The position control mechanism 100 has, as described above, the movable part 100a, the fixed part 100b, and the movement guide 100g. By sliding of the movable part 100a along the movement guide 100g, the position of the movable part 100a relative to the fixed part 100b can be changed.

Figure 7A:
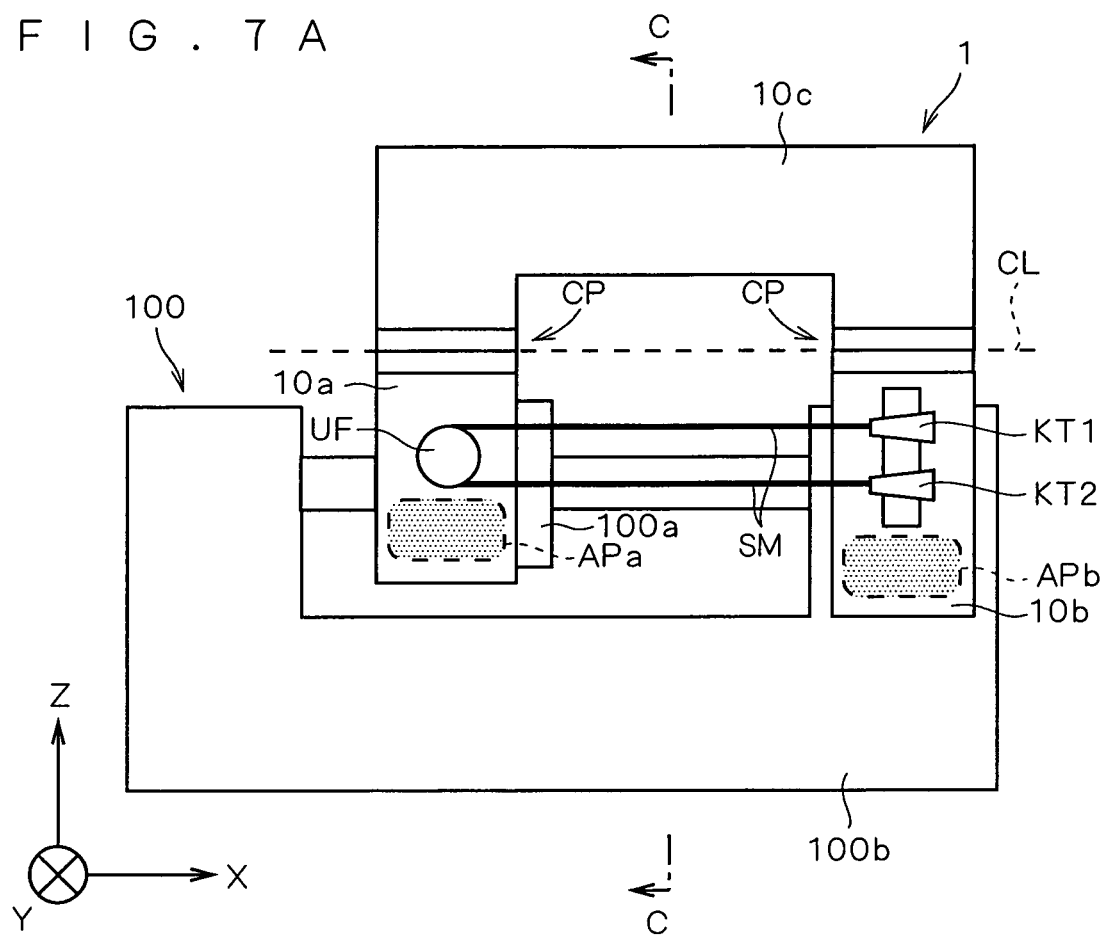
FIGS. 7A and 7B are diagrams illustrating a state where the manufacturing unit is attached to the position control mechanism.
Figure 7B:
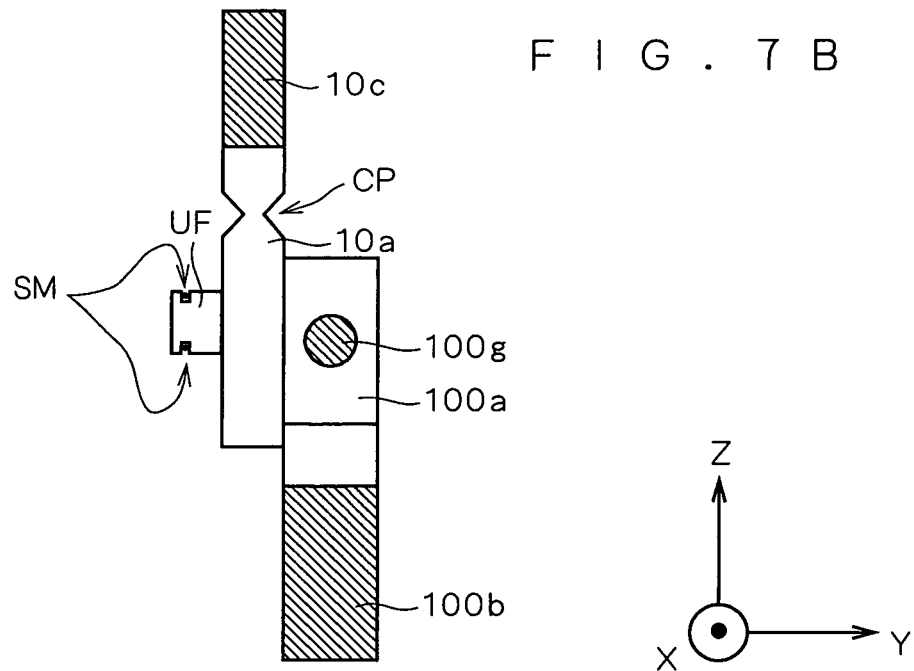

FIGS. 7A and 7B illustrate a state where the manufacturing unit 1 is attached to the position control mechanism 100. FIG. 7A is a front appearance view illustrating a state where the manufacturing unit 1 is attached to the position control mechanism 100, and FIG. 7B is a cross section taken along line C-C of FIG. 7A.

As shown in FIGS. 7A and 7B, the manufacturing unit 1 in which the shape memory alloy SM is held in step S2 is constructed so that the surface on the side opposite to the surface for which the U-turn hook UF is provided of the movable holder 10a serves as a surface adhered to the movable part 100a, and the surface on the side opposite to the surface for which the metal terminals KT1 and KT2 are provided of the fixing holder 10b serves as a surface adhered to the fixed part 100b. Concretely, by adhering the movable holder 10a and the movable part 100a to each other in an adhesion part APa, the movable holder 10a is attached to the movable part 100a. By adhering the fixing holder 10b and the fixed part 100b to each other in an adhesion part APb, the fixing holder 10b is attached to the fixed part 100b.

The manufacturing unit 1 and the position control mechanism 100 are adhered to each other in a state where they are pressed with small force in a predetermined position. Preferably, the positional relations among the manufacturing unit 1, the movable part 100a, and the fixed part 100b at the time of adhesion have some allowances for the following reason. When adhesion is carried out with strict position relations, there is the possibility such that positioning is performed with force, unnecessary stress is applied to members, members are deformed and, as a result, the precision of adjustment of the length of the shape memory alloy SM deteriorates. When attachability is considered, in the movable part 100a and the fixed part 100b, the surfaces to which the manufacturing unit 1 is attached preferably face in almost the same direction.

Although the case where the manufacturing unit 1 and the position control mechanism 100 are adhered to each other has been described above, the present invention is not limited to the case. For example, they may be adhered to each other by another method such as welding. When they are adhered to each other by a conventional method such as screwing in which load such as rotation torque is applied to members, distortion or deviation occurs in the members and, as a result, precision of adjustment of the length of the shape memory alloy SM may deteriorate. Consequently, it is preferable that they be adhered to each other by a method that does not apply stress to the members.

Next, the coupler 10c is separated from the manufacturing unit 1 attached to the position control mechanism 100 in step S3 (step S4 in FIG. 2).

The details of step S4 will now be described.

In step S4, by cutting the boundary portion CP along a broken line CL with, for example, a hot nipper or the like in the state shown in FIGS. 7A and 7B, the coupler 10c coupling the movable holder 10a and the fixing holder 10b is separated from the manufacturing unit 1, so that a partial area connecting the movable holder 10a and the fixing holder 10b is removed from the manufacturing unit 1. As a result, the movable holder 10a and the fixing holder 10b are separated from each other.

As described above, the thickness in the ±Y directions of the boundary portion CP is extremely smaller than that of the other portion of the manufacturing unit 1. That is, the boundary portion CP has a structure that is resistive to stress in the directions (±X directions) in which tension is applied to the shape memory alloy SM, and is sensitive to stress in the directions (Y directions) perpendicular to the X directions. Therefore, by sandwiching the boundary portion CP from the Y directions by a hot nipper or the like at the time of cutting the boundary portion CP, the boundary portion CP can be cut while suppressing the load in the ±X directions on the shape memory alloy SM as much as possible. As a result, a small amount of energy is sufficient for the cutting, and the parts of the manufacturing unit 1 and the shape memory alloy SM can be prevented from being unnecessarily deformed.

Since the thickness in the Y directions of the boundary portion CP is much smaller than that of the other part of the manufacturing unit 1, the thin part also functions as a marking indicative of the cut position, so that the user can perform cutting work without making a mistake in the cut position. Further, since the manufacturing unit 1 including the boundary portion CP is mainly made of plastic, the boundary portion CP can be cut easily by cutting method using heat while suppressing stress applied to the manufacturing unit 1 as much as possible.

As shown in FIGS. 7A and 7B, preferably, the part of the broke line CL to be cut is sufficiently apart from the position in which the shape memory alloy SM is projected in the Y direction in the manufacturing unit 1 so that the shape memory alloy SM and the cutting tool such as a hot nipper do not come into contact with each other at the time of cutting operation. Specifically, assuming a case of attaching the shape memory alloy SM to an almost center portion of the manufacturing unit 1, it is sufficient that the part to be cut is positioned near the outer periphery of the manufacturing unit 1.

When the coupler 10c is cut away from the manufacturing unit 1 in step S4, the position controller 500 as shown in FIGS. 1A and 1B is completed. The distance between the movable holder 10a and the fixing holder 10b is equal to or more than the expandable range of the shape memory alloy SM. That is, in the manufacturing unit 1, the movable holder 10a and the fixing holder 10b are apart from each other only by the distance corresponding to the expandable range of the shape memory alloy SM or more, and the driving range of the movable part 100a by expansion/contraction of the shape memory alloy SM is therefore assured. Each of the separated movable holder 10a and the fixing holder 10b is provided with at least one member for holding the shape memory alloy SM (in this case, the U-turn hook UF and the metal terminals KT1 and KT2) and the shape memory alloy SM expands/contracts by passage of current, thereby moving the movable part 10a.

More concretely, when current is passed to the shape memory alloy SM, the shape memory alloy SM contracts and the movable part 100a is guided by the movement guide 100g and slides (in this case, moves straight) to the metal terminals KT1 and KT2 side (in the +X direction). It is sufficient to perform the operation in the opposite direction, that is, the operation in the −X direction of the movable part 100a by assembling another driver or a spring (not shown). The driver or the spring used for the operation of moving the movable part 100a in the −X direction may be attached in a state where sliding of the movable part 100a is inhibited by a stopper after the coupler 10c is cut away from the manufacturing unit 1, or preliminarily assembled in the manufacturing unit 1

As described above, in the preferred embodiment of the present invention, in a state where the manufacturing unit 1 is made independent of the position controller 500, the shape memory alloy SM can be attached while tension is held to be constant in the unit. Consequently, it becomes easy to adjust the length of the shape memory alloy SM with precision of a few μm to hundreds μm and assemble the resultant shape memory alloy SM. That is, the manufacturing unit 1 is attached to the position control mechanism 100 without applying unnecessary load while maintaining the shape of the manufacturing unit 1 and, after that, the coupler 10c as a high-rigidity member is separated. Thus, the driver 10 can be assembled to the position control mechanism 100 without deteriorating the adjustment state of the shape memory alloy SW.

Concretely, at the time of manufacturing the position controller 500 including the driver 10, the manufacturing unit is used which includes: the fixing holder 10b for being attached to the fixed part 100b in a state where both ends of the shape memory alloy SM are held by the metal terminals KT1 and KT2; the movable holder 10a for being attached to the movable part 100a in a state where the shape memory alloy SM is held by the U-turn hook UF; and the coupler 10c coupling the movable holder 10a and the fixing holder 10b.

With such a configuration, the length of the shape memory alloy SM is adjusted with high precision in the state of the manufacturing unit 1 in which the movable holder 10a and the fixing holder 10b are coupled and fixed via the coupler 10c, and the resultant manufacturing unit 1 is attached to the position control mechanism 100. After that, the movable holder 10a and the fixing holder 10b are separated from each other. By such a method, the length of the shape memory alloy SM can be adjusted in a state where the distance between the movable holder 10a and the fixing holder 10b is fixed. As a result, the actuator having electrical conductivity (conductive actuator) using the shape memory alloy can be attached to the position control mechanism with high precision without being influenced by various errors such as a size error of parts and an attachment error.

At the time of manufacturing the position controller 500, first, the manufacturing unit 1 having the coupler 10c coupling the movable holder 10a and the fixing holder 10b, the movable holder 10a, and the fixing holder 10b is prepared (or obtained). The manufacturing unit 1 is held in a state where the shape memory alloy is held under tension between the movable holder 10a and the fixing holder 10b. Further, the movable holder 10a is attached to the movable part 100a, and the fixing holder 10b is attached to the fixed part 100b. After that, by cutting the coupler 10c from the manufacturing unit 1, the movable holder 10a and the fixing holder 10b are separated from each other. By such a method, the length of the shape memory alloy SM can be adjusted in a state where the distance between the movable holder 10a and the fixing holder 10b is fixed. As a result, the conductive actuator using the shape memory alloy can be attached to the position control mechanism with high precision without being influenced by various errors such as a size error of parts and an attachment error. In particular, such a method is effective at the time of mass-producing very-small position controllers with high precision.

Each of the movable holder 10a, the fixing holder 10b, and the coupler 10c has a plate shape, the movable holder 10a and the fixing holder 10b have holding members for holding the shape memory alloy SM in their surfaces facing a predetermined direction, and the surfaces facing a direction opposite to the predetermined direction are attached to the position control mechanism 100. With the configuration, the manufacturing unit 1 using the shape memory alloy SM can be easily attached to the position control mechanism 100.

Since the holding members for holding the shape memory alloy SM include the metal terminals KT1 and KT2 for holding the shape memory alloy SM by caulking, the ends of the shape memory alloy SM can be fixed to the manufacturing unit 1 also in a narrow space.

Since the manufacturing unit 1 is attached to the position control mechanism 100 by a method such as bonding and welding which does not apply load on the members, the driver using the shape memory alloy can be attached to the position control mechanism with high precision. When fastening means such as screwing is used like in the conventional method, fastening operation is performed in a state where a force for fastening is applied (in a deformed state). Consequently, the positional relation between the movable holder 10a and the fixing holder 10b already adjusted at the time of separating the coupler 10c deteriorates. As a result, the possibility that the attachment precision of the driver deteriorates is high.

Modifications

Although the preferred embodiment of the present invention has been described above, the present invention is not limited to the above description.

For example, in the foregoing preferred embodiment, the manufacturing unit 1 is a plate plastic part having the U shape. The present invention, however, is not limited to the preferred embodiment. For example, when the part is a plate part having a hollow shape, effects similar to those of the foregoing preferred embodiment can be also obtained.

The case of using a plate manufacturing unit 2 having a hollow shape will be briefly described with reference to FIGS. 8A and 8B.

Figure 8B:
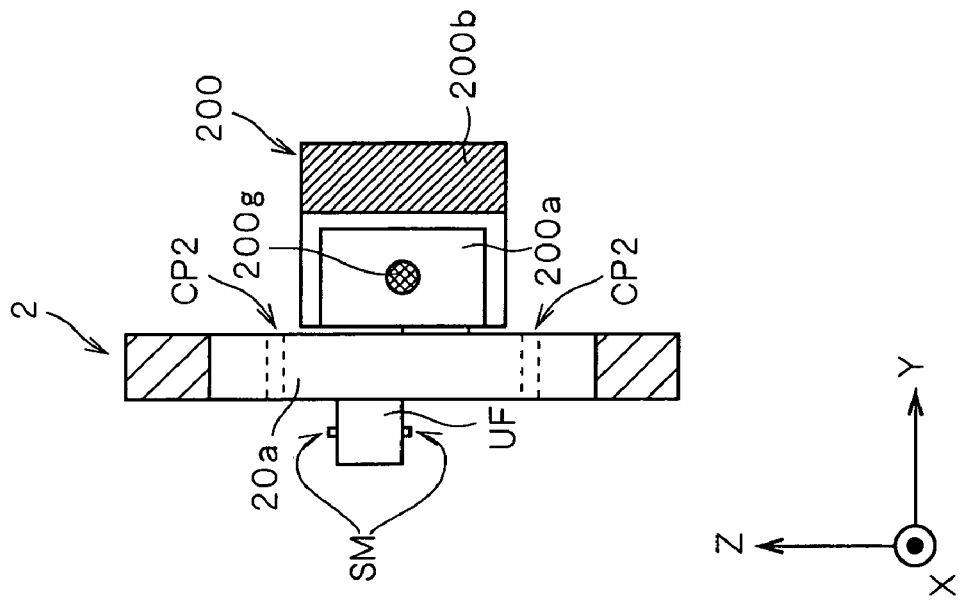
FIGS. 8A and 8B are diagrams showing manufacture of a position controller according to a modification.
Figure 8A:
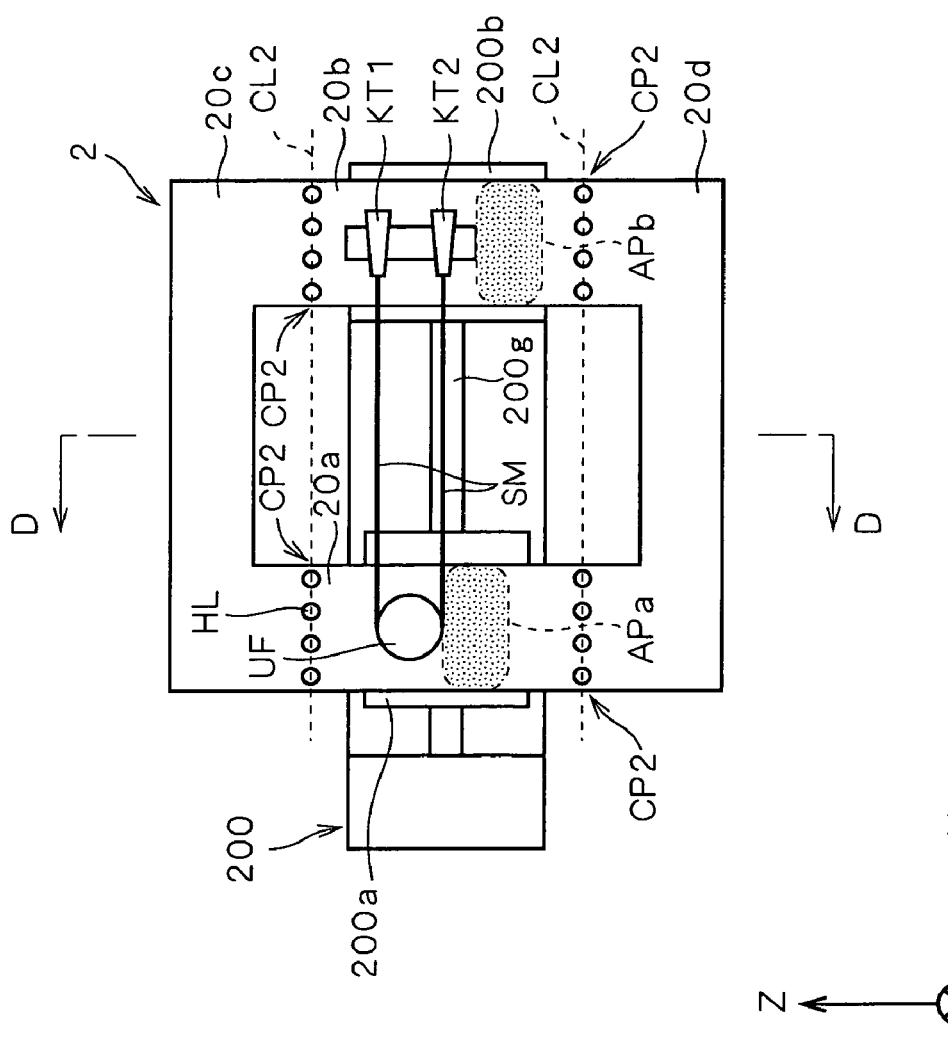

FIGS. 8A and 8B show a state where the manufacturing unit 2 having the hollow shape is attached to a position control mechanism 200. FIG. 8A is a front appearance view illustrating the state where the manufacturing unit 2 is attached to the position control mechanism 200, and FIG. 8B is a cross section taken along line D-D of FIG. 8A.

As shown in FIGS. 8A and 8B, the manufacturing unit 2 is a plate plastic part having a small length in the Y directions, spread in an XZ plane, and having the hollow shape. The −X side of a center portion of two sides in the vertical direction in the diagram is constructed as a movable holder 20a, and the +X side is constructed as a fixing holder 20b. Further, the manufacturing unit 2 has couplers 20c and 20d that couple the movable holder 20a and the fixing holder 20b from above and below in the diagram. Each of the movable holder 20a, the fixing holder 20b, and the couplers 20c and 20d is a plate-shaped member having high rigidity.

The U-turn hook UF by which the shape memory alloy SM is hooked to be held is provided for the surface in the −Y direction of the movable holder 20a, and the metal terminals KT1 and KT2 for holding and fixing both ends of the shape memory alloy SM by caulking are provided for the surface in the −Y direction of the fixing holder 20b.

A plurality of holes HL along broken lines CL2 in the diagram are provided so as to penetrate the border portion CP2 between the movable holder 20a and the couplers 20c and 20d, and the border portion CP2 between the fixing holder 20b and the couplers 20c and 20d. As a result, a cut line such as a perforation is obtained.

To the manufacturing unit 2, for example, first, one end of the string-like shape memory alloy SM is held and fixed by the metal terminal KT1 by caulking. In a state where the shape memory alloy SM is retained and held in the groove in the U-turn hook UF and predetermined tension is applied, the other end of the shape memory alloy SM is held and fixed by the metal terminal KT2 by caulking. To the metal terminals KT1 and KT2, wires for passing current to the shape memory alloy SM are connected.

On the other hand, the position control mechanism 200 has a movable part 200a, a fixed part 200b, and a movement guide 200g. The movable part 200a slides along the movement guide 200g, thereby changing the position of the movable part 200a relative to the fixed part 200b.

As shown in FIGS. 8A and 8B, the manufacturing unit 2 in which the shape memory alloy SM is held is attached in the following manner. The movable holder 20a and the movable part 200a are adhered to each other in the adhesion part APa with light stress, thereby attaching the movable holder 20a to the movable part 200a. The fixing holder 20b and the fixed part 200b are adhered to each other with light stress in the adhesion part APb, thereby attaching the fixing holder 20b to the fixed part 200b. For a reason similar to that of the foregoing preferred embodiment, the attachment may be carried out by another method such as welding which suppresses application of load onto members as much as possible and, preferably, with some allowances in the positional relations.

By cutting the boundary portion CP2 along a broken line CL2 with, for example, a hot nipper or the like in the state shown in FIGS. 8A and 8B, the couplers 20c and 20d coupling the movable holder 20a and the fixing holder 20b are separated, so that the movable holder 20a and the fixing holder 20b are separated from each other. Thus, a position controller having a configuration almost similar to that of the position controller shown in FIGS. 1A and 1B can be completed.

Since the perforation is provided by the line of the plurality of holes HL in the border portion CP2 as the cut position, the structure is obtained that is resistive to stress in the directions (±X directions) in which tension is applied to the shape memory alloy SM, and is sensitive to stress in the directions (±Y directions) perpendicular to the ±X directions. Therefore, by sandwiching the boundary portion CP2 from the ±Y directions by a hot nipper or the like at the time of cutting the boundary portion CP2, the load in the ±X directions on the shape memory alloy SM can be suppressed as much as possible. As a result, a small amount of energy is sufficient for the cutting, and the shape memory alloy SM can be prevented from being unnecessarily deformed. The perforation in the boundary portion CP2 also functions as marking indicative of a cut position.

By reciprocating the movable part by two shape memory alloys by using a plate-shape manufacturing unit 3 having an E shape, effects similar to those of the foregoing preferred embodiment can be obtained.

The case using the manufacturing unit 3 will be briefly described with reference to FIGS. 9A and 9B. FIGS. 9A and 9B show a state where the manufacturing unit 3 having the E shape is attached to a position control mechanism 300. FIG. 9A is a front appearance view illustrating the state where the manufacturing unit 3 is attached to the position control mechanism 300, and FIG. 9B is a cross section taken along line E-E of FIG. 9A.

As shown in FIGS. 9A and 9B, the manufacturing unit 3 is a plate plastic part having a small length in the ±Y directions, spread in an XZ plane, and having the E shape. In the manufacturing unit 3, a center portion in the X direction of three sides in the vertical direction in the diagram is constructed as a movable holder 30a, the −X side is constructed as a fixing holder 30ba, and the +X side is constructed as a movable holder 30bb. Further, the manufacturing unit 3 has a coupler 30c that couples the movable holder 30a and the fixing holders 30ba and 30bb from above in the diagram. Each of the movable holder 30a, the fixing holders 30ba and 30bb, and the coupler 30c is a plate-shaped member having high rigidity.

The U-turn hook UF by which the first and second shape memory alloys SM1 and SM2 are hooked to be held is provided for the surface in the −Y direction of the movable holder 30a, and the metal terminals KT1 and KT2 for holding and fixing both ends of the first shape memory alloy SM1 by caulking are provided for the surface in the −Y direction of the fixing holder 30ba. In addition, metal terminals KT11 and KT12 for holding and fixing both ends of the second shape memory alloy SM2 by caulking are provided for the surface in the −Y direction of the fixing holder 30bb. To the metal terminals KT1 and KT2 and the metal terminals KT1 and KT12, wires for passing current to the first and second shape memory alloys SM1 and SM2 are connected.

A groove along a broken line CL3 is provided in the surface and the under face of a portion (border portion) CP3 of the border between the movable holder 30a and the coupler 30c and the border between each of the fixing holders 30ba and 30bb and the coupler 30c.

To the manufacturing unit 3, for example, first, one end of the first string-like shape memory alloy SM1 is held and fixed by the metal terminal KT1 by caulking. In a state where the first shape memory alloy SM1 is retained and held in the groove in the U-turn hook UF and predetermined tension is applied, the other end of the first shape memory alloy SM1 is held and fixed by the metal terminal KT2 by caulking. One end of the second string-like shape memory alloy SM2 is held and fixed by the metal terminal KT11 by caulking. In a state where the second shape memory alloy SM2 is retained and held in the groove in the U-turn hook UF and predetermined tension is applied, the other end of the second shape memory alloy SM2 is held and fixed by the metal terminal KT12 by caulking.

On the other hand, the position control mechanism 300 has a movable part 300a, a fixed part 300b having a U shape, and a movement guide 300g provided so as to serve as a bridge between two parallel sides of the fixed part 300b. The movable part 300a slides along the movement guide 300g, thereby changing the position of the movable part 300a relative to the fixed part 300b.

As shown in FIGS. 9A and 9B, the manufacturing unit 3 in which the first and second shape memory alloys SM1 and SM2 are held is attached to the position control mechanism 300. Concretely, the movable holder 30a and the movable part 300a are adhered to each other in the adhesion part APa with light stress, thereby attaching the movable holder 30a to the movable part 300a. The surface in the +Y direction of each of the fixing holders 30ba and 30bb and the surface in the −Y direction of both ends of the fixed part 300b are adhered in a state where light stress is applied in the adhesion parts APba and APbb, thereby attaching the fixing holders 30ba and 30bb to the fixed part 300b. For a reason similar to that of the foregoing preferred embodiment, the attachment may be carried out by another method such as welding which suppresses application of load onto members as much as possible and, preferably, with some allowances in the positional relations.

When the coupler 30c coupling the movable holder 30a and the fixing holders 30ba and 30bb is cut away by cutting a boundary portion CP3 along a broken line CL3 with, for example, a hot nipper or the like in the state shown in FIGS. 9A and 9B, the movable holder 30a, the fixing holder 30ba, and the fixing holder 30bb are separated from each other. As a result, a position controller 600 (refer to FIGS. 10A and 10B) can be completed.

Since the grooves are provided in the surface and the under face of the boundary portion CP3 as the cut position, the structure is obtained that is resistive to stress in the directions (±X directions) in which tension is applied to the first and second shape memory alloys SM1 and SM2, and is sensitive to stress in the directions (±Y directions) perpendicular to the ±X directions. Therefore, by sandwiching the boundary portion CP3 from the ±Y directions by a hot nipper or the like at the time of cutting the boundary portion CP3, the load in the ±X directions on the first and second shape memory alloys SM1 and SM2 can be suppressed as much as possible. As a result, a small amount of energy is sufficient for the cutting, and the first and second shape memory alloys SM1 and SM2 can be prevented from being unnecessarily deformed. The grooves in the boundary portion CP3 also function as marking indicative of a cut position.

FIGS. 10A and 10B are diagrams illustrating the complete position controller 600. FIG. 10A is a front appearance view of the position controller 600, and FIG. 10B is a cross section taken along line F-F of FIG. 10A.

In the position controller 600, when current is passed to the first shape memory alloy SM1, the first shape memory alloy SM1 contracts so that, while being guided along the movement guide 300g, the movable part 300a slides straight to the fixing holder 30ba side (in the −X direction). At this time, current is not passed to the second shape memory alloy SM2, and the second shape memory alloy SM2 expands only by the amount of movement of the movable part 300a due to elastic deformation in a deformation region of superelasticity. On the other hand, when current is passed to the second shape memory alloy SM2, the second shape memory alloy SM2 contracts so that, while being guided along the movement guide 300g, the movable part 300a slides straight to the fixing holder 30bb side (in the +X direction). At this time, current is not passed to the first shape memory alloy SM1, and the first shape memory alloy SM1 expands only by the amount of movement of the movable part 300a due to elastic deformation in a deformation region of superelasticity.

Although the first and second shape memory alloys SM1 and SM2 are held by a single U-turn hook UF, the present invention is not limited to the preferred embodiment. For example, U-turn hooks for holding the first and second shape memory alloys SM1 and SM2 may be separately provided.

Although the movable holders 10a, 20a, and 30a are attached to the movable parts 100a, 200a, and 300a, respectively, in the foregoing preferred embodiments, the present invention is not limited to the configuration. For example, when the movable holder has also the function of the movable part, effects similar to those of the foregoing preferred embodiments can be obtained.

A concrete example will be described with reference to FIG. 11. Since the form shown in FIG. 11 is similar to that shown in FIG. 7, the same reference numerals are designated to similar parts.

Figure 11:
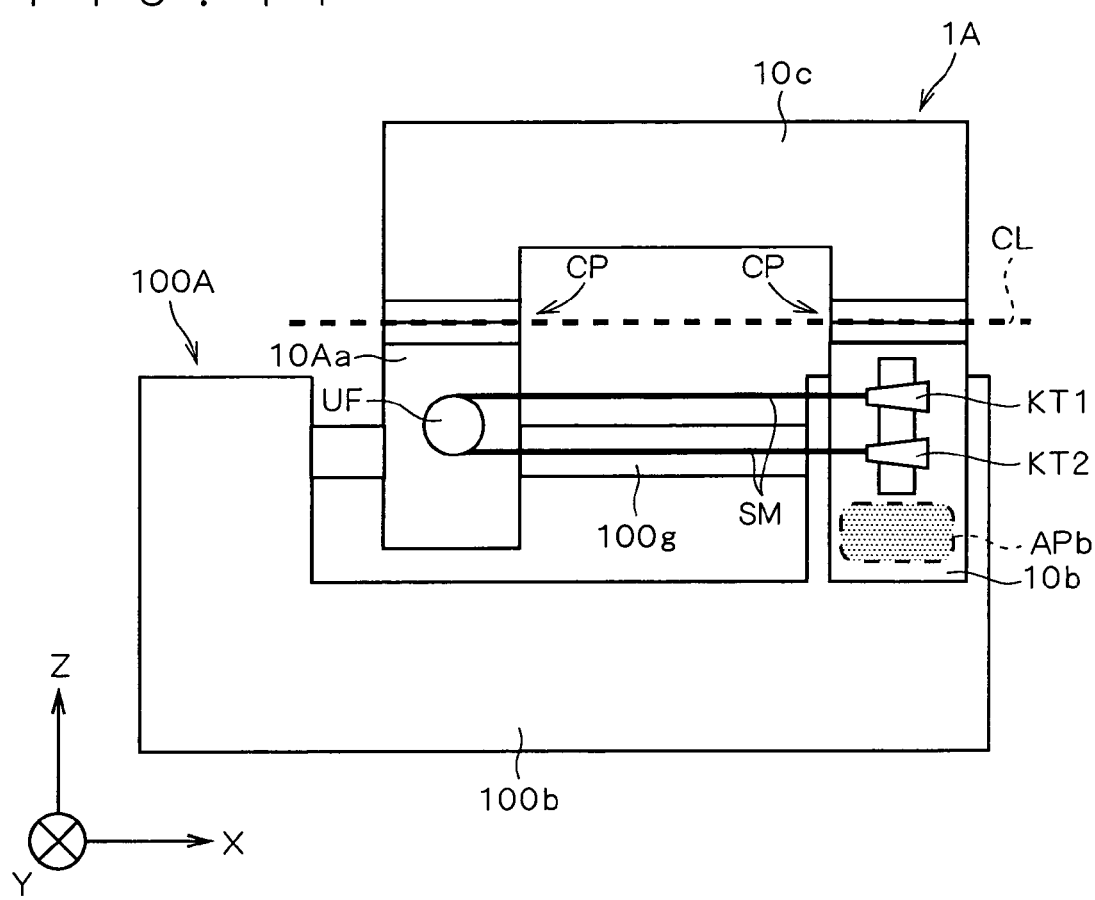
FIG. 11 is a diagram showing manufacture of a position controller according to a modification.

As shown in FIG. 11, a position controller 100A has the U-shaped fixed part 100b and the movement guide 100g provided to serve as a bridge between two sides of the U shape of the fixed part 10b. On the other hand, the manufacturing unit 1A has a movable holder 10Aa to which the U-turn hook UF is provided and which also has the function of the movable part, the fixing holder 10b provided with the metal terminals KT1 and KT2, and the coupler 10c coupling the movable holder 10Aa and the fixing holder 10b.

First, the shape memory alloy SM is attached to the manufacturing unit 1A and, after that, the movable holder 10Aa is slidably attached to the movement guide 100g. Next, by adhering the fixing holder 10b and the fixed part 100b in the adhesion part APb, the fixing holder 10b is attached to the fixed part 100b. Finally, the coupler 10c is cut away from the manufacturing unit 1A by cutting the boundary portion CP along the broken line CL, the position controller 500 can be completed.

Although the position control mechanism is a linear guide in which the movable part moves one-dimensionally in the foregoing preferred embodiments, the present invention is not limited to the configuration. For example, the position control mechanism may be a stage in which the movable part moves two-dimensionally (two-dimensional stage), a so-called biaxial gimbal, or a mechanism in which the movable part moves multidimensionally.

In the case of using, for example, a position control mechanism in which the movable part is movable in directions along three axes of X, Y, and Z of a three-dimensional orthogonal coordinate system, a movement vector along one of the axes and a movement vector along another axis are orthogonal to each other. Therefore, expand/contract directions of a shape memory alloy moving along one of the axes and expand/contract directions of a shape memory alloy moving along another axis are almost orthogonal to each other. Consequently, expansion/contraction of a shape memory alloy along one axis does not exert much influence on precision of the length of a shape memory alloy moving along another axis.

By attaching two or more shape memory alloys for moving the movable part in two or more directions to the manufacturing unit and, after that, cutting the connection part away, the position controller in which the movable part can be moved in two or more directions may be manufactured.

Although the boundary portion CP is cut with a hot nipper in the foregoing preferred embodiments, the present invention is not limited to the hot nipper. The boundary portion CP may be cut with another means using heat or the like, that does not apply much load to the manufacturing unit 1, such as an ultrasonic cutter or a laser cutter.

Although the manufacturing unit 1 is made of plastic in the foregoing preferred embodiments, the present invention is not limited to plastic. For example, the manufacturing unit 1 may be made of a metal, and passage of current to the shape memory alloy may be relayed. If the manufacturing unit 1 is made of a metal, on assumption that the boundary portion CP connecting the movable holder 10a, the fixing holder 10b, and the coupler 10c is coupled by welding, the boundary portion may be cut while melting the welded part with heat by using a laser cutter or the like.

Although a U-turn hook is provided for the movable holder and metal terminals are provided for the fixing holder in the foregoing preferred embodiments, the present invention is not limited to the preferred embodiments. For example, metal terminals may be provided for the movable holder and a U-turn hook may be provided for the fixing holder.

Alternately, metal terminals may be provided for both of the movable holder and the fixing holder, and both ends of a string-shaped shape memory alloy may be held and fixed by both of the metal terminals. It is sufficient that at least one of the movable holder and the fixing holder holds and fixes the shape memory alloy by the metal terminal.

Although a string-shaped shape memory alloy is used in the foregoing preferred embodiments, the present invention is not limited to the string-shaped shape memory alloy. For example, a band-like shape memory alloy may be used. It is sufficient to use a shape memory alloy having sufficient anisotropism so that the direction of moving the movable part becomes the longitudinal direction.

Although the string-shaped shape memory alloy is used as an actuator having conductivity (conductive actuator) in the foregoing preferred embodiments, the position controller can be constructed by using a band-shaped shape memory alloy. In this case, the string-shaped shape memory alloy is a shape memory alloy such that the length of a cross section is twice as long as the breadth or less when the shape memory alloy is cut in a plane perpendicular to the direction of tension. The band-shaped shape memory alloy is a shape memory alloy such that the length exceeds twice of the breadth. The conductive actuator is not limited to an actuator using a shape memory alloy but any actuator whose length can be changed by passage of current may be used. Another actuator such as a conductive polymer actuator can be used.

While the invention has been shown and described in detail, the foregoing description is in all aspects illustrative and not restrictive. It is therefore understood that numerous modifications and variations can be devised without departing from the scope of the invention.

What is claimed is:

1. A manufacturing unit used in the manufacture of a driver that is to be attached to a position control mechanism having a fixed part and a movable part and changes position of said movable part relative to said fixed part, said manufacturing unit comprising:

a first holder for being attached to said movable part in a state where a predetermined position in a conductive actuator is held by said first holder;

a second holder for being attached to said fixed part in a state where another predetermined position which is different from said predetermined position in said conductive actuator is held by said second holder and tension is applied to said conductive actuator between said first holder and said second holder in a first direction; and a coupler formed contiguously with said first and second holders; and wherein each of a first boundary portion between said first holder and said coupler and a second boundary portion between said second holder and said coupler is more resistive to stress in said first direction than in a second direction perpendicular to said first direction to enable said coupler to resist the tension applied to said conductive actuator in said first direction while being adapted to be separated at said first and second boundary portions after said first holder is attached to said movable part and said second holder is attached to said fixed part.

2. The manufacturing unit according to claim 1, wherein each of said first and second holders and said coupler has a plate shape, and each of said first and second holders has a holding member for holding said conductive actuator in a surface facing in a predetermined direction and has another surface for being attached to said position control mechanism, said another surface facing in a direction opposite to said predetermined direction.

3. The manufacturing unit according to claim 2, wherein said holding member includes a metal terminal for holding said conductive actuator by caulking.

4. The manufacturing unit according to claim 1, wherein said conductive actuator includes a string-like shape memory alloy.

5. The manufacturing unit according to claim 1, wherein said conductive actuator includes a band-like shape memory alloy.

6. The manufacturing unit according to claim 1, wherein said first and second boundary portions are constructed so as to be distinguished from other parts in said manufacturing unit in appearance.

7. The manufacturing unit according to claim 1, wherein said conductive actuator is held by said first and second holders in a state where predetermined tension is applied between said first and second holders.

8. The manufacturing unit according to claim 4, wherein said second holder has first and second holding members for holding both ends of said string-like shape memory alloy respectively, and said first holder has a U-turn hook by which said string-like shape memory alloy is retained and held.

* * * * *